G. GEER.
STEERING GEAR FOR AUTOMOBILES.
APPLICATION FILED APR. 2, 1908.
911,489. Patented Feb. 2, 1909.
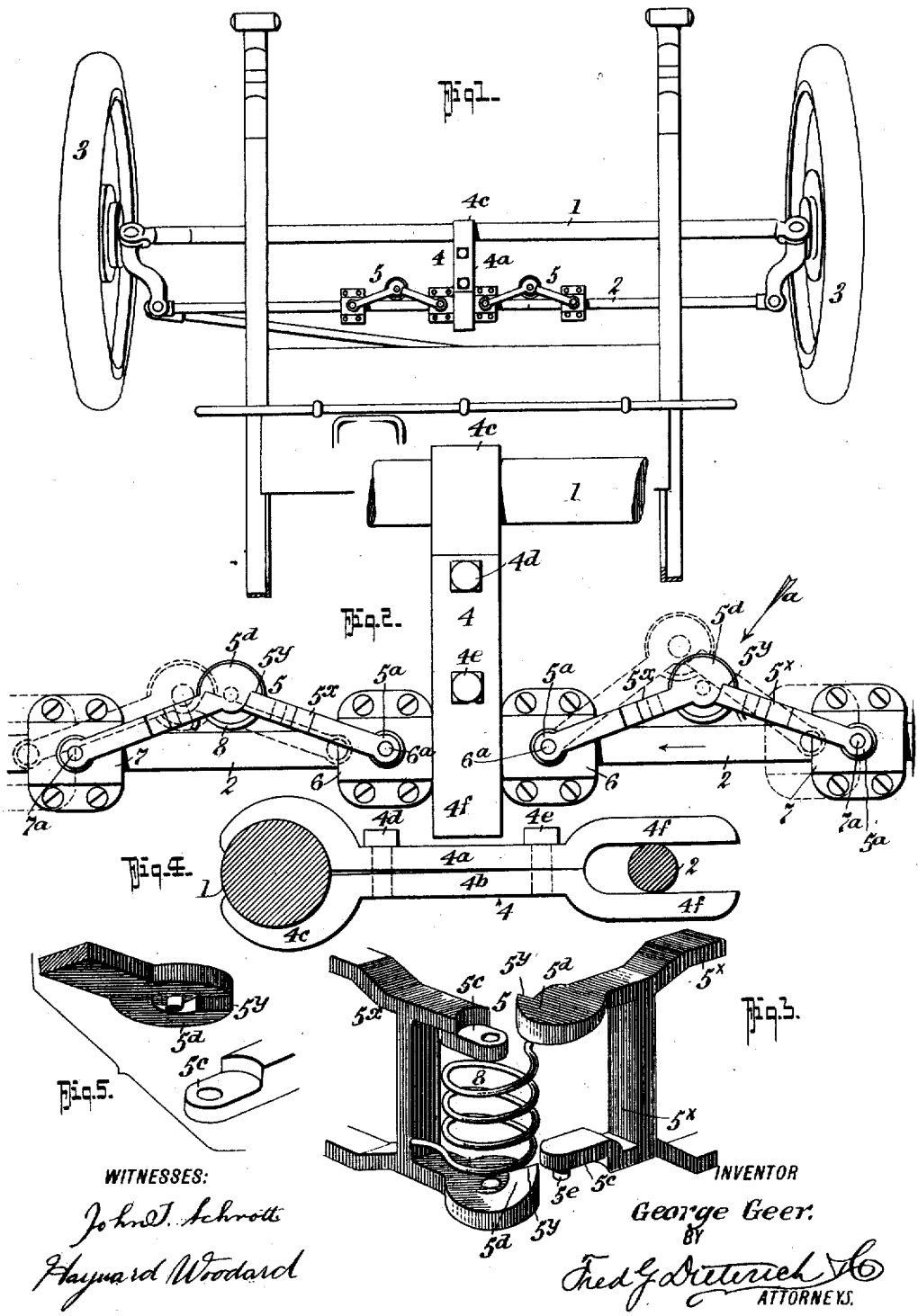

UNITED STATES PATENT OFFICE.

GEORGE GEER, OF RICHMOND, VIRGINIA.

STEERING-GEAR FOR AUTOMOBILES.

No. 911,489.   Specification of Letters Patent.   Patented Feb. 2, 1909.

Application filed April 2, 1908. Serial No. 424,833.

*To all whom it may concern:*

Be it known that I, GEORGE GEER, residing at Richmond, in the county of Henrico and State of Virginia, have invented certain new and useful Improvements in Steering-Gear for Automobiles, of which the following is a specification.

My invention relates to certain new and useful improvements in steering gears for automobiles, motor vehicles and the like, and in its generic nature the invention embodies an improved means for holding the steering rod in a counterbalanced position, as it were, to prevent the automobile running out of its course and normally hold the wheels in a position to adjust the machine in a straight line forward.

Generically the invention embodies a clamp member secured to the front axle of the machine having a portion for surrounding the steering rod and buffer devices carried by the steering rod on each side of the clamp or means that surrounds the steering rod to engage said clamp and normally hold the steering rod in a midway position to direct the wheels in a continuously forward direction to enable the operator to release his hold on the steering wheel, while running forwardly.

My invention also includes those novel details of construction, combination and arrangement of parts, all of which will be first described in detail, and be specifically pointed out in the appended claims, reference being had to the accompanying drawings, in which:—

Figure 1, is a plan view of an automobile embodying my invention. Fig. 2, is a diagrammatic view showing the position of the parts when the steering rod is in its normal or midway position to direct the vehicle forwardly in a straight direction, in full lines and showing the position of the parts when the steering rod is moved in the direction of the arrow. Fig. 3, is a detail perspective view, taken in the direction of arrow *a* on Fig. 2. Fig. 4, is a detail view of the axle clamping member hereinafter referred to. Fig. 5, is a detail perspective view illustrating the manner of pivotally locking the toggle links.

Referring now to the accompanying drawings in which like letters and numerals of reference indicate like parts in all of the figures, 1 designates the axle and 2 the steering rod, while the wheels are designated by the reference numeral 3. The axle, the wheels and the steering rod together with the means for operating the steering rod to move it lengthwise may be of any approved type, as the same *per se*, form no part of my present invention.

4 designates the clamp or bracket member which is provided with a clamping section $4^c$ to embrace the axle 1 to which it is secured through the medium of the bolts $4^d$, and $4^e$, the member 4 being made in two sections, $4^a$ and $4^b$. The clamp or bracket member 4 also has its fork $4^f$ which is adapted to receive the steering rod 2, and on each side of which the buffer devices hereinafter referred to are adapted to be mounted on the steering rod.

The buffer devices 5 being of the same construction a detail description of one of such devices it is thought will be sufficient. The buffer devices 5 each comprise a pair of toggle arms $5^x$—$5^x$ having eyes $5^a$ at their ends and spaced apart to receive the studs $6^a$ of clamping members 6 to form a pivotal connection therewith, the clamping members 6 being formed in two sections and bolted together onto the steering rod 2, it being understood that the clamping members 6 have a free longitudinal movement on the steering rod 2 and are not clamped tightly thereto. The other toggle arms $5^x$ have ears $5^a$ to receive the studs $7^a$ of a second clamp 7 of like construction to the clamp 6, but secured rigidly to the rod 2, so as to move therewith, it being understood that the clamp 6 abuts the fork $4^f$ of the bracket member 4.

Each toggle arm $5^x$ has a pair of ears $5^c$, one of which is apertured, and the other is provided with a stud $5^e$, so that the stud of one section $5^x$ may enter the aperture of the other section $5^x$, when the parts are assembled.

One of the toggle arm sections of each buffer section $5^x$ is provided with a stop member $5^d$ which terminates in shoulders $5^y$ to engage the arm of the other toggle sections $5^x$, as clearly indicated in Fig. 3, a coil spring 8 being provided between the stop members $5^d$ and held in place thereby. The coil spring 8 is adapted to normally tend to hold the toggle sections or arms $5^x$ into alinement with one another to separate the respective pairs of clamps 6 and 7.

The manner in which my invention operates will be best explained as follows:—Assume the parts to be in the position shown in Fig. 2, with the steering rod in its midway position, to cause the vehicle to run forwardly in a straight line. The operator desiring to direct the vehicle to one side or the other, through the medium of his hand wheel, moves the steering rod 2 in the direction of the arrow. This causes the bracket 6 to be moved toward the bracket 7 and the toggle arms 5$^x$ of the right hand buffer member 5 to be drawn toward one another to move the spring 8 away from the steering rod 2. At the same time the bracket 6 of the other buffer member 5 will move along with the steering rod in the direction of the arrow, it being understood that the shoulder 5$^y$ of the left hand buffer member 5 abuts the arm 5$^x$ and prevents the sections 5$^x$—5$^x$ of the left hand buffer member 5 from separating or alining themselves further. As soon as the operator lets go of the steering wheel the springs 8 will tend to again return the parts to their normal position with the steering rod 2 in a midway position to direct the wheels 3 in a straight course to make the machine run forwardly in a straight line. The same operation takes place should the steering rod be moved in a direction opposite to the arrow in Fig. 2.

Should the wheels strike an obstruction and be turned from their straight direction, while the operator has his hands off of the steering wheel the buffer springs 8 of the toggle devices will serve to return the machine into a straight running direction immediately the obstruction is passed, thus insuring the machine running always in a straight forward direction when the operator has his hands off the steering wheel or when the machine is not under control of the operator in moving the steering rod in one direction or the other.

From the foregoing description taken in connection with the accompanying drawings it is thought the complete construction, operation and many advantages of my invention will be readily understood by those skilled in the art to which the invention appertains.

What I claim is:

1. In a steering gear, the combination with the axle and the steering rod that connects with the wheels, of a bracket member relatively fixedly secured to the axle and embracing the steering rod, together with buffer devices secured to the steering rod at each side of the bracket to normally hold the rod in a predetermined position, said buffer devices each comprising a fixed clamp, and a clamp slidable on the steering rod together with spring operated toggle devices connecting said fixed and slidable clamps, each of said spring operated toggle devices comprising a pair of toggle arms pivotally secured to said brackets and to one another, a coil spring mounted on said toggle arms, and tending to normally bring said arms in alinement with one another.

2. In a steering gear, the combination with the axle and the steering rod that connects with the wheels, of a bracket member relatively fixedly secured to the axle and embracing the steering rod, together with buffer devices secured to the steering rod on each side of the bracket to normally hold the steering rod in a predetermined position, said buffer devices each comprising a fixed clamp, and a clamp slidable on the steering rod, together with spring operated toggle devices connecting said fixed and slidable clamps, each of said spring operated toggle devices comprising a pair of toggle arms pivotally secured to said brackets and to one another, a coil spring mounted on said toggle arms and tending to normally bring said arms in alinement with one another, and stop members carried by said toggle arms for limiting the movement thereof under spring pressure.

3. In a steering gear for automobiles, a bracket or clamp member fixedly securable to the axle, and having a passage through which the steering rod may pass, combined with buffer devices carried by the steering rod to coöperate with said clamp or bracket to normally hold the steering rod in a midway position, said buffer devices each comprising a clamp relatively fixed to the steering rod and another clamp slidable on the steering rod, a pair of toggle levers pivotally connected at one end to said clamps and pivotally connected to one another at their other ends, a coil spring carried by said arms at their pivotal connection tending to move said arms into alinement with one another.

4. In a steering gear for automobiles, a bracket or clamp member fixedly securable to the axle, and having a passage through which the steering rod may pass, combined with buffer devices carried by the steering rod to coöperate with said clamp or bracket to normally hold the steering rod in a midway position, said buffer devices each comprising a clamp relatively fixed to the steering rod and another clamp slidable on the steering rod, a pair of toggle levers pivotally connected at one end to said clamps and pivotally connected to one another at their other ends, a coil spring carried by said arms at their pivotal connection tending to move said arms into alinement with one another, and means carried by one of said arms for preventing the alining movement of said arms beyond a predetermined amount.

GEORGE GEER.

Witnesses:
E. H. HEALD,
C. B. GARNETT.